United States Patent
Ou et al.

(10) Patent No.: US 9,614,568 B2
(45) Date of Patent: Apr. 4, 2017

(54) ELECTRONIC DEVICE FOR ACTIVATING AND DEACTIVATING WIRELESS COMMUNICATION BY A POWER SUPPLY SWITCH CONFIGURATION

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Guang-Feng Ou, Wuhan (CN); Yu-Hsu Lin, Santa Clara, CA (US)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 104 days.

(21) Appl. No.: 14/553,346

(22) Filed: Nov. 25, 2014

(65) Prior Publication Data

US 2016/0072537 A1 Mar. 10, 2016

(30) Foreign Application Priority Data

Sep. 9, 2014 (CN) .......................... 2014 1 0454591

(51) Int. Cl.
| | |
|---|---|
| *H04B 1/3827* | (2015.01) |
| *H04B 1/38* | (2015.01) |
| *G06F 1/26* | (2006.01) |
| *H01H 9/16* | (2006.01) |

(52) U.S. Cl.
CPC .............. *H04B 1/3827* (2013.01); *G06F 1/26* (2013.01); *H01H 9/161* (2013.01); *H04B 1/38* (2013.01); *H04B 1/3838* (2013.01)

(58) Field of Classification Search
CPC ............ H05B 33/0833; H05B 33/0845; H01H 13/023; H01H 9/161; H04B 1/3827; H04B 1/3833; H04B 1/38; H04B 1/3838; G06F 1/26
See application file for complete search history.

(56) References Cited

U.S. PATENT DOCUMENTS

| | | | | |
|---|---|---|---|---|
| 2014/0349718 A1* | 11/2014 | Ou | ........................ | H04B 1/3838 455/572 |
| 2015/0186684 A1* | 7/2015 | Wang | ...................... | G06F 21/81 726/36 |
| 2016/0072537 A1* | 3/2016 | Ou | ........................ | H04B 1/3827 455/73 |

* cited by examiner

*Primary Examiner* — Bobbak Safaipour
*Assistant Examiner* — Devan Sandiford
(74) *Attorney, Agent, or Firm* — Zhigang Ma

(57) ABSTRACT

An electronic device includes a wireless module, a power supply, and a switch module. The wireless module is adapted to receive or send a wireless signal. The power supply is adapted to supply power for the wireless module. The switch module is connected between the wireless module and the power supply, and the switch module includes a first switch and a transistor. A collector terminal of the transistor is coupled to the power supply, the first switch is coupled to the collector terminal and the base terminal of the transistor, and an emitter terminal of the transistor is coupled to the wireless module. The transistor is switched on when the first switch is switched on, and the power supply supplies power for the wireless module. The transistor is switched off when the first switch is switched off, and the power supply is disconnected from the wireless module.

18 Claims, 3 Drawing Sheets

ELECTRONIC DEVICE FOR ACTIVATING AND DEACTIVATING WIRELESS COMMUNICATION BY A POWER SUPPLY SWITCH CONFIGURATION

CROSS-REFERENCE TO RELATED APPLICATIONS

This application claims priority to Chinese Patent Application No. 201410454591.X filed on Sep. 9, 2014, the contents of which are incorporated by reference herein.

FIELD

The subject matter herein generally relates to an electronic device with a wireless module.

BACKGROUND

Electronic devices, such as tablet personal computers, personal digital assistants, smart phones, and so on, include a wireless module for transceiving wireless signals.

BRIEF DESCRIPTION OF THE DRAWINGS

Implementations of the present technology will now be described, by way of example only, with reference to the attached figures.

DETAILED DESCRIPTION

Figure 1:
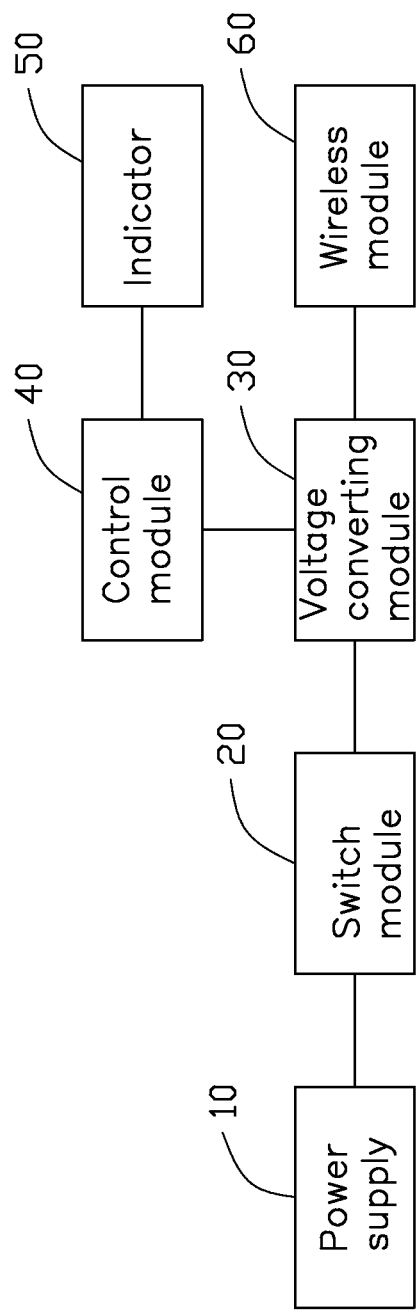
FIG. 1 is a block diagram of one embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

FIG. 1 illustrates an electronic device in accordance with one embodiment. The electronic device can include a power supply 10, a switch module 20, a voltage converting module 30, a control module 40, an indicator 50, and a wireless module 60. In at least one embodiment, the electronic device may be a tablet personal computer, a personal digital assistant, a smart phone, and so on. The indicator 50 may be a light emitting diode.

Figure 2:
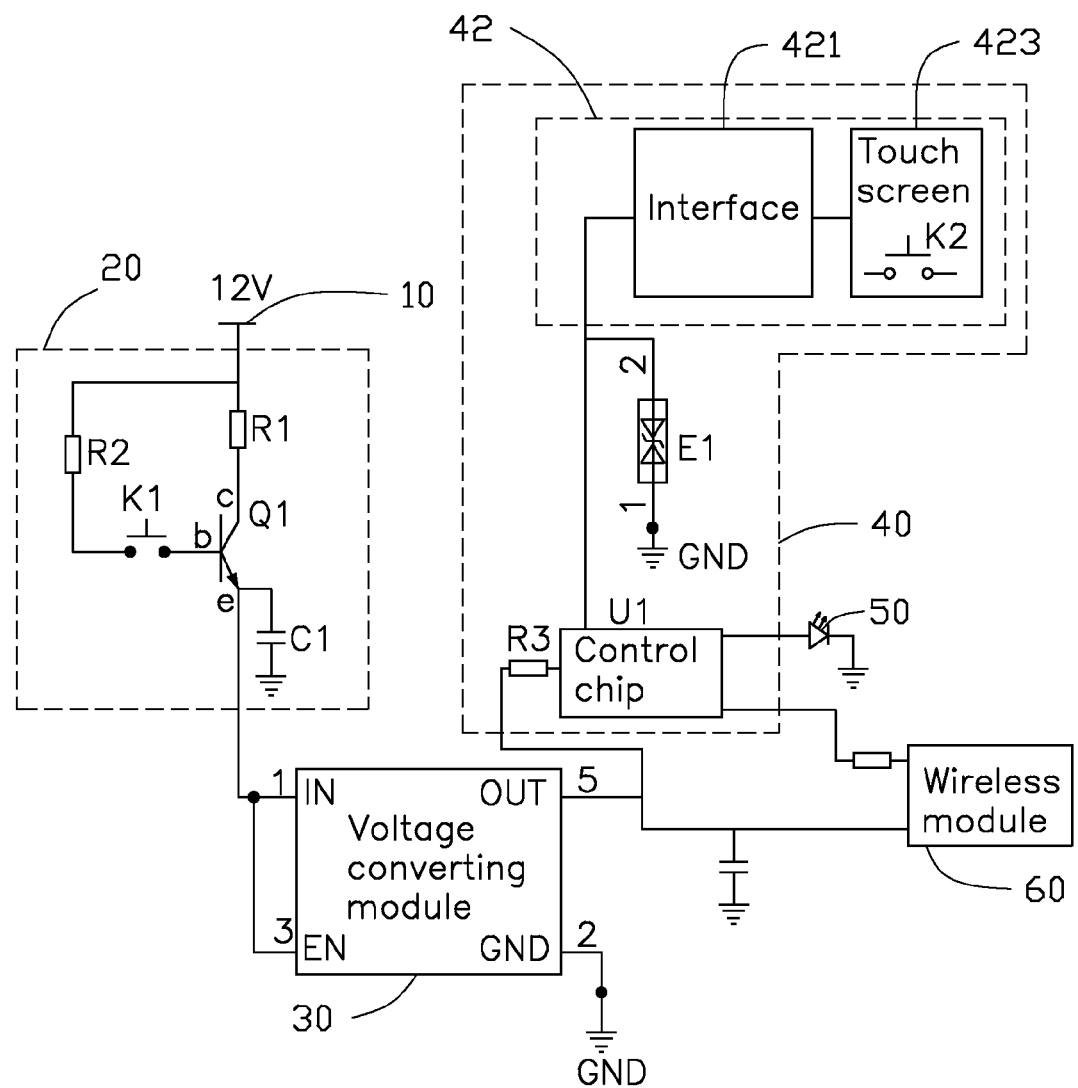
FIG. 2 is a circuit diagram of the electronic device of FIG. 1.
Figure 3:
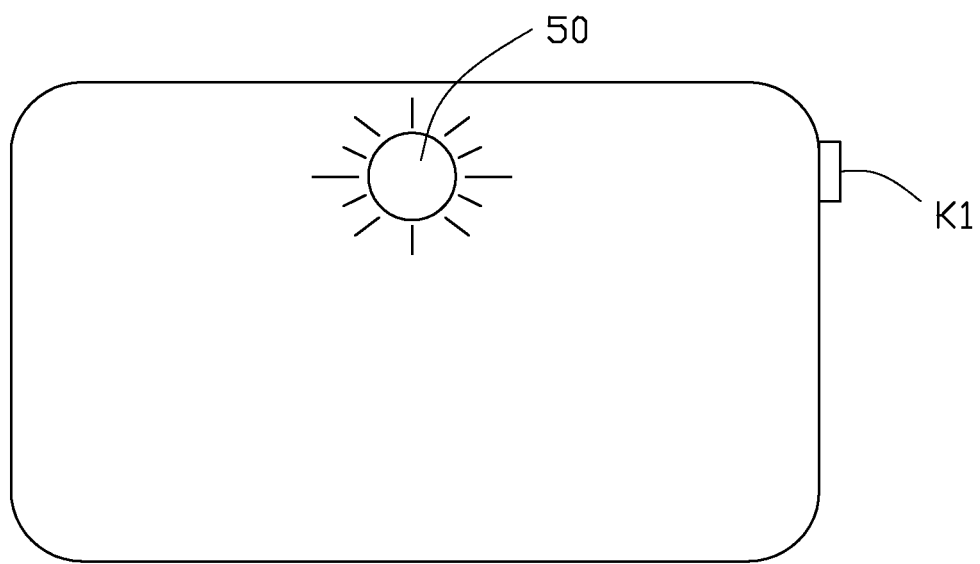
FIG. 3 is diagrammatic view of the electronic device in one embodiment.

FIG. 2 illustrates that the switch module 20 can include a first resistor R1, a second resistor R2, a first switch K1, a transistor Q1, and a first capacitor C1. In at least one embodiment, the first switch K1 (shown in FIG. 3) is positioned on one side of the electronic device. A first terminal of the first resistor R1 is coupled to the power supply 10 and a first terminal of the second resistor R2, and a second terminal of the first resistor R1 is coupled to a collector terminal of the transistor Q1. A second terminal of the second resistor R2 is coupled to a base terminal of the transistor Q1 via the first switch K1. An emitter terminal of the transistor Q1 is coupled to a first terminal of the first capacitor C1 and the voltage converting module 30. A second terminal of the first capacitor C1 is grounded.

An input terminal and an enable terminal of the voltage converting module 30 are coupled to the emitter terminal of the transistor Q1, an output terminal of the voltage converting module 30 is coupled to the control module 40, a second capacitor C2 is coupled to the wireless module 60. The voltage converting module 30 is configured to convert an output voltage outputted by the power supply 10 to a working voltage of the wireless module 60.

The control module 40 can include a third resistor R3, a control chip U1, a surge controller E1, a setting module 42. In at least one embodiment, the control chip U1 may be a central processing unit or a complex programmable logic device. A first terminal of the third resistor R3 is coupled to the output terminal of the voltage converting module 30 and the wireless module 60, and a second terminal of the third resistor R3 is coupled to the control chip U1. The setting module 42 is coupled to the control chip U1 and can power on or off the indicator 50. The setting module 42 can include an interface 421 and a touch screen 423. The touch screen 423 is coupled to a second terminal of the surge controller E1 and the control chip U1 via the interface 421. A second switch K2 can be located on the touch screen 423.

When the first switch K1 and the second switch K2 are switched on, the transistor Q1 is switched on. The power supply 10 is connected with the wireless module 60 and can supply power for the wireless module 60. When the wireless module 60 is in use, the voltage converting module 30 can output a high-logic level (e.g. 3.3 V) to the control chip U1. The control chip U1 can output a first voltage signal to the indicator 50 upon receiving the high-logic level. The indicator 50 can emit a first indicator signal upon receiving the first voltage signal, and the first indicator signal shows the wireless module 60 being in use.

When the wireless module 60 is not in use, the voltage converting module 30 can output a low-logic level (e.g. 0 V) to the control chip U1. The control chip U1 can output a second voltage signal to the indicator 50 upon receiving the low-logic level. The indicator can emit a second indicator signal upon receiving the second voltage signal, and the second indicator signal shows the wireless module 60 not being in use. The light intensity of the first indicator signal is greater than the light intensity of the second indicator signal. When the first switch K1 is switched off, the transistor Q1 is switched off, and the power supply module 10 is disconnected from the wireless module.

The embodiments shown and described above are only examples. Many details are often found in the art such as the other features of an electronic device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. An electronic device comprising:
a transceiver for receiving and sending a wireless signal;
a power supply adapted to supply power to the transceiver;
a switch module connected between the transceiver and the power supply, the switch module comprising a first switch and a transistor having a collector terminal which is coupled to the power supply, and an emitter terminal which is coupled to the transceiver,
wherein the first switch is coupled to the collector terminal and the base terminal of the transistor,
the transistor is configured such that when the transistor is switched on, the first switch is switched on, and the power supply supplies power for the transceiver, and
the transistor is further configured such that when the transistor is switched off, the first switch is switched off, and the power supply is disconnected from the transceiver.

2. The electronic device of claim 1, wherein the collector terminal of the transistor is coupled to the power supply via a first resistor, the first switch is coupled to the collector terminal of the transistor via the first resistor and a second resistor.

3. The electronic device of claim 1, further comprising a voltage converter, wherein the voltage converter is coupled to the emitter terminal of the transistor and the transceiver and configured to convert an output voltage outputted by the power supply to a working voltage of the transceiver and a control chip.

4. The electronic device of claim 3, further comprising an indicator, wherein the control chip is coupled to the voltage converter and the indicator, and the control chip is configured to control the indicator to send different indicator signals when receiving the working voltage.

5. The electronic device of claim 4, wherein the indicator is a light emitting diode.

6. The electronic device of claim 4, wherein the control chip is coupled to the voltage converter via a third resistor, and a positive terminal of the indicator is coupled to the control chip, and a negative terminal of the indicator is grounded.

7. The electronic device of claim 6, wherein the voltage converter is configured to output a high-logic level to the control chip when the first switch is switched on, the control chip is configured to output a first voltage signal, and the indicator is configured to emit a first indicator signal showing the transceiver being in use upon receiving the first voltage signal; the voltage converter is configured to output a low-logic level to the control chip, the control chip is configured to output a second voltage signal, and the indicator is configured to emit a second indicator signal showing the transceiver not being in use.

8. The electronic device of claim 7, wherein the light intensity of the first indicator signal is greater than the light intensity of the second indicator signal.

9. The electronic device of claim 8, further comprising a setting module, wherein the setting module comprises an interface and a touch screen, the touch screen is coupled to a second terminal of the a surge controller and the control chip via the interface.

10. The electronic device of claim 9, wherein the touch screen comprises a second switch to switch on or off the indicator.

11. An electronic device comprising:
a transceiver for receiving and sending a wireless signal;
a power supply adapted to output a voltage to supply power to the transceiver;
a switch module coupled to the power supply;
a voltage converter coupled between the switch module and the transceiver;
an indicator configured to indicate a use status of the transceiver;
a control chip coupled to the voltage converter and the indicator,
wherein the transistor is configured such that when the switch module is switched on, and the power supply supplies power for the transceiver,
the voltage converter is configured to output a high-logic level signal to the control chip, the control chip is configured to output a first voltage signal when receiving the high-logic level signal, and the indicator is configured to emit a first indicator signal showing the transceiver being in use;
the voltage converter is configured to output a low-logic level signal to the control chip, the control chip is configured to output a second voltage signal when receiving the low-logic level signal, and the indicator is configured to emit a second indicator signal showing the transceiver not being in use; and
the transistor is further configured such that when the switch module is switched off, and the power supply is disconnected from the transceiver.

12. The electronic device of claim 11, wherein the switch module comprise a first switch and a transistor, a collector terminal of the transistor is coupled to the power supply, the first switch is coupled between the collector terminal and the base terminal of the transistor, and an emitter terminal of the transistor is coupled to the voltage converter.

13. The electronic device of claim 12, wherein the collector terminal of the transistor is coupled to the power supply via a first resistor, the first switch is coupled to the collector terminal of the transistor via the first resistor and a second resistor.

14. The electronic device of claim 12, wherein the voltage converter is configured to convert the voltage outputted by the power supply to a working voltage of the transceiver and the control chip.

15. The electronic device of claim 11, wherein the control chip is coupled to the voltage converter via a third resistor, and a positive terminal of the indicator is coupled to the control chip, and a negative terminal of the indicator is grounded.

16. The electronic device of claim 11, wherein the light intensity of the first indicator signal is greater than the light intensity of the second indicator signal.

17. The electronic device of claim 11, further comprising a setting module, wherein the setting module comprises an interface and a touch screen, the touch screen is coupled to a second terminal of the a surge controller and the control chip via the interface.

18. The electronic device of claim 11, wherein the indicator is a light emitting diode.

* * * * *